United States Patent [19]

Von Strandtmann et al.

[11] 3,843,730

[45] Oct. 22, 1974

[54] ORTHO-HYDROXY-OMEGA-(METHYLSULFINYL)ACETONAPHTHONES AND PROCESS FOR PRODUCING SAME

[75] Inventors: Maximilian Von Strandtmann, Rockaway; John Shavel, Jr., Mendham; Sylvester Klutchko, Hackettstown; Marvin P. Cohen, New Milford, all of N.J.

[73] Assignee: Warner-Lambert Company, Morris Plains, N.J.

[22] Filed: Aug. 27, 1973

[21] Appl. No.: 392,152

Related U.S. Application Data

[63] Continuation-in-part of Ser. No. 174,947, Aug. 25, 1971, Pat. No. 3,801,644.

[52] U.S. Cl. .................................. 260/592
[51] Int. Cl. .............................. C07c 49/82
[58] Field of Search .......................... 260/592

[56] References Cited
UNITED STATES PATENTS
3,345,416  10/1967  Russell et al. ............ 260/592
3,355,494  11/1967  Lyness et al. ............ 260/592

*Primary Examiner*—Daniel D. Horwitz
*Attorney, Agent, or Firm*—Albert H. Graddis, Frank S. Chow, Anne M. Kelly

[57] ABSTRACT

The present invention relates to ortho-hydroxy-ω-(methylsulfinyl)acetonaphthones of the formula I:

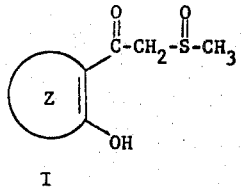

I wherein the Z ring has one of the following structures:

(a) 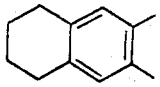 or (b)

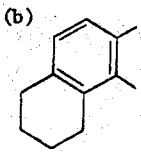

and a novel process for producing them. The compounds of the present invention are useful as intermediates for the production of chromones which are useful for the treatment of allergic conditions and for the treatment of hyperacidity.

3 Claims, No Drawings

ORTHO-HYDROXY-OMEGA-(METHYLSULFINYL)ACETONAPHTHONES AND PROCESS FOR PRODUCING SAME

CROSS REFERENCE TO RELATED APPLICATION

This application is a continuation-in-part of our co-pending U.S. application Ser. No. 174,947, filed Aug. 25, 1971, now U.S. Pat. No. 3,801,644.

SUMMARY OF THE INVENTION

Novel ortho-hydroxy-ω-(methylsulfinyl)acetonaphthones of the formula I:

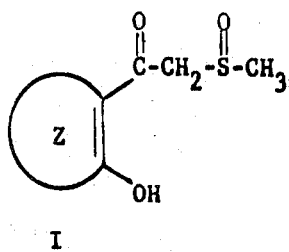

I wherein the Z ring has one of the following structures:

(a) 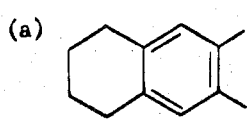 or (b) 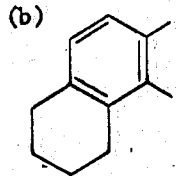

are disclosed. The compounds of the invention are prepared according to the novel process of this invention by reacting dimethyl sulfoxide with sodium hydride in an inert solvent and adding thereto an ortho-hydroxy, partially saturated naphthoate; maintaining the reaction mixture at a temperature no higher than 50°C during the formation of the reaction product and adding a nonpolar solvent to precipitate the reaction product.

DETAILED DESCRIPTION OF THE INVENTION

Novel compounds of this invention embraced by formula I include 5',6',7',8'-tetrahydro-3'-hydroxy-2-(methylsulfinyl)-2'-acetonaphthone (II) and 5',6',7',8'-tetrahydro-1'-hydroxy-2-(methylsulfinyl)-2'-acetonaphthone (III):

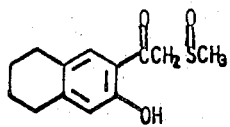 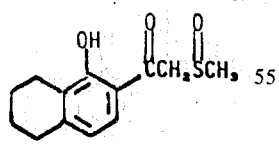

II         III

These compounds are intermediates from which pharmacologically active compounds may be produced as described in co-pending U.S. application Ser. No. 387,861, filed Apr. 18, 1973. Generally, in order to obtain the pharmacologically active final products, compounds of the formula II or III are reacted with 2 moles of formaldehyde, and treated thermally to eliminate methylsulfenic acid. The final products obtained, 6,7,8,9-tetrahydro-3-(hydroxymethyl)-4H-naphtho[2,3-b]pyran-4-one and 7,8,9,10-tetrahydro-3-(hydroxymethyl)-4H-naphtho[1,2-b]pyran-4-one have been found to be useful in the treatment of allergic conditions and for the treatment of hyperacidity.

Compounds of this invention having the above-mentioned formula I may be prepared according to the novel process of this invention. Sodium hydride, which may be used as a dispersion in mineral oil, is added to a mixture of dimethyl sulfoxide in an inert organic solvent. Suitable as solvents are those which are inert to the reactants and have a boiling point higher than the temperatures at which the desired reaction takes place. For the purpose of the present invention, benzene is the preferred inert solvent.

Dimethyl sulfoxide and benzene are placed in a reaction vessel and reacted in an inert atmosphere, i.e., the vessel is swept with nitrogen. The mixture is agitated by bubbling the nitrogen through it or by mechanical stirring or shaking. Sodium hydride (57 percent dispersion in mineral oil) may be added all at once or incrementally. The nitrogen atmosphere is maintained above the mixture, the agitation is continued, and the mixture is heated to a temperature in the range of 75°C to 80°C for about three quarter's of an hour to one hour. This is the preferred range of temperature which should not be exceeded greatly, since temperatures much above this may cause decomposition of the sodium methylsulfinylmethide formed by the reaction mixture. If too much heat is added to the system, it may become explosive. Temperatures much lower than the preferred range, while operable, decrease the reaction rate excessively. When the reaction is complete, the mixture in the vessel is cooled to about 35°C.

The second part of the process of this invention involves the addition of an ortho-hydroxy, partially saturated naphthoate to the sodium methylsulfinylmethide in the reaction vessel incrementally, while stirring or otherwise agitating the mixture. This reaction is exothermic. It is desirable to carry it out at such a rate that the temperature does not rise above 50°C. The stirring is continued until such time as the temperature falls to about 25°C, which usually is only a matter of about one half hour. The reaction solution, which contains a sodium salt reaction product, is then diluted with a nonpolar solvent, such as ether. A precipitate forms which is filtered out, then washed with dry ether and dissolved in ice water. The solution obtained is filtered and the filtrate is acidified with glacial acetic acid to reprecipitate the final product.

According to a related process, 2'-hydroxy-2-(methylsulfinyl)-acetophenone is prepared from dimethylsulfoxide, an aromatic ester and a strong base, as described in U.S. Pat. No. 3,345,416 issued Sept. 4, 1963, to G. A. Russell and H. D. Becker. A further variation of the process described in the aforementioned U.S. Pat. No. appears in Becker et al., J. Am. Chem. Soc. 85: 3410, 1963, on page 3413: an unsubstituted-ortho-hydroxy-ω-(methylsulfinyl)acetophenone is obtained by dissolving potassium-t-butoxide in dimethylsulfoxide and reacting the resulting product with methylsalicylate. The yield reported by Becker et al. is 18 percent of theory. There is no stated utility for the reaction product obtained by Becker et al.

Applicants have found that the unsubstituted-ortho-hydroxy-ω-(methylsulfinyl)acetophenone of Becker et al. has no utility for the purposes of the present invention, in that the 3-(hydroxymethyl)-chromone derivative produced from the Becker et al. intermediate has no oral anti-allergenic activity and, when administered interperitoneally, produces central nervous system side effects, such as convulsions. Additionally, using the novel process of the present invention, higher yields of the substituted 2'-hydroxy-2-(methylsulfinyl)acetophenones are obtained than provided by the Becker et al. method.

To further illustrate the practice of this invention, the following examples are included:

EXAMPLE I

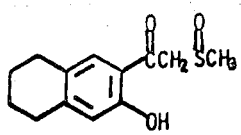

5',6',7',8'-tetrahydro-3'-hydroxy-2-(methylsulfinyl)-2'-acetonaphthone.

To a mixture of 120 ml of benzene, and 60 ml of dimethylsulfoxide is added 4.4 g of NaH 57 percent oil dispersion. The mixture is heated with stirring under a stream of nitrogen on a water bath at about 75°C. for 45 minutes. The clear solution is cooled to about 25°C. in an icebath, the bath removed, and 6.18 g of methyl 5,6,7,8-tetrahydro-3-hydroxy-2-naphthoate* is added with stirring. The temperature rises to 40°C. The solution is stirred until the temperature drops to 25°C. (45 minutes) and is then diluted to 500 ml. with anhydrous ether. The precipitate is filtered off, washed with anhydrous ether, and dissolved in 30 ml. of water. The aqueous solution is then adjusted to about pH 6 in the cold with glacial acetic acid. The precipitate is filtered off, washed with water, and recrystallized from absolute ethanol, mp. 170°-171°C.; yield 3.5 g (47 percent).
*Ann. 426:147

Anal. Calcd. for $C_{13}H_{16}O_3S$: C,61.88; H, 6.39; S, 12.71. Found: C, 61.83; H. 6.51; S, 12.77.

EXAMPLE II

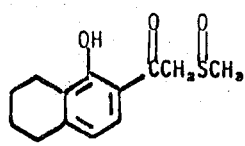

5',6',7',8'-tetrahydro-1'-hydroxy-2-(methylsulfinyl)-2'-acetonaphthone.

To a mixture of 120 ml. of benzene, and 60 ml. of dimethylsulfoxide is added 4.4 g of NaH (57 percent mineral oil suspension). The mixture is heated with stirring under a stream of nitrogen on a water bath at about 75°C. for 45 minutes. The clear solution is cooled to about 25°C. in an icebath, the bath removed, and 6.18 g of methyl 5,6,7,8-tetrahydro-1-hydroxy-2-naphthoate* is added with stirring. The temperature rises to 40°C. The solution is stirred until the temperature drops to 25°C. (45 minutes) and is then diluted to 500 ml. with anhydrous ether. The precipitate is filtered off, washed with anhydrous ether, and dissolved in 30 ml of water. The aqueous solution is then adjusted to about pH 6 in the cold with glacial acetic acid. The precipitate is filtered off, washed with water, and recrystallized from absolute ethanol, mp. 128°-295°C.; yield 3 g (40 percent).
*Ann. 426:158

Anal. Calcd. for $C_{13}H_{16}O_3S$; C,61.88; H, 6.39; S, 12.71. Found: C, 61.76; H, 6.39; S, 12.61.

We claim:
1. A compound of the formula I:

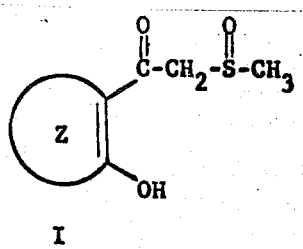

wherein the Z ring has one of the following structures:

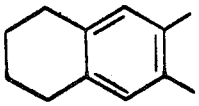 or 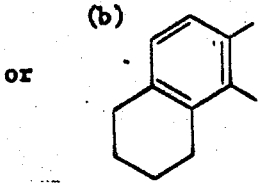

2. A compound according to claim 1 which is 5',6',7-',8'-tetrahydro-3'-hydroxy-2-(methylsulfinyl)-2'-acetonaphthone.

3. A compound according to claim 1 which is 5',6',7-',8'-tetrahydro-1'-hydroxy-2-(methylsulfinyl)-2'-acetonaphthone.

* * * * *